(No Model.)

C. RUDOLPH & G. LEVAVASSEUR.
FLEXIBLE METALLIC PIPE.

No. 605,587. Patented June 14, 1898.

Witnesses

Inventors
Charles Rudolph
Georges Levavasseur

UNITED STATES PATENT OFFICE.

CHARLES RUDOLPH AND GEORGES LEVAVASSEUR, OF PARIS, FRANCE.

FLEXIBLE METALLIC PIPE.

SPECIFICATION forming part of Letters Patent No. 605,587, dated June 14, 1898.

Application filed September 3, 1897. Serial No. 650,544. (No model.) Patented in France August 8, 1896, No. 258,770.

*To all whom it may concern:*

Be it known that we, CHARLES RUDOLPH, manufacturer, and GEORGES LEVAVASSEUR, technologist, citizens of the Republic of France, residing at Paris, in the Republic of France, have invented certain new and useful Improvements in Flexible Metallic Pipes, (for which we have received Letters Patent in France, No. 258,770, dated August 8, 1896,) of which the following is a specification.

This invention relates to that class of flexible metallic pipes which are formed by winding spirally a metal strip of any suitable form, shape, or profile in such a way that the various spirals engage one with another, a packing consisting of a thread of india-rubber being interposed between the engaging edges of the spirals in order to insure the tightness of the pipe.

It has for its object to provide a simple and efficacious means for maintaining the elastic packing in place and preventing its slipping out of its place under any circumstances. It consists, essentially, in inserting and retaining this elastic packing in a fold or groove formed for this object on one of the edges of the profiled metal strip, hereinbefore mentioned, in such a way that this packing is not in contact with the engaging edges of the spirals, the respective displacements of which resulting from the bending of the pipe or from the internal pressure to which they are exposed would tend to cause it to be displaced either on the outside or inside of the pipe, thus causing the latter to become leaky.

In pipes of this kind at present in use the packing-strip or washer is interposed between the engaging edges of the spirals, so that when the pipe is sharply bent or is subjected to a high internal pressure the packing, being strongly compressed by the said edges, is partially or wholly projected or forced through or into the interstices of the spirals by reason of its elasticity.

The invention will now be described in detail, reference being made to the accompanying drawings, in which—

Figure 1:
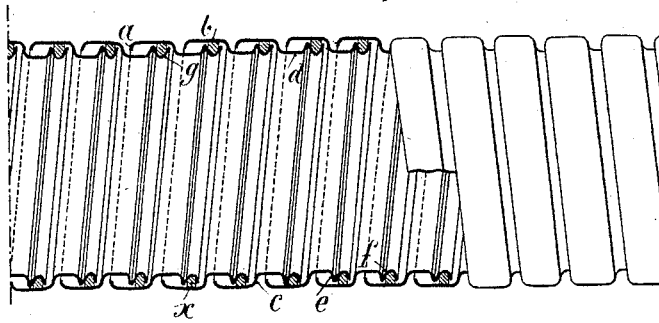
Figure 2:
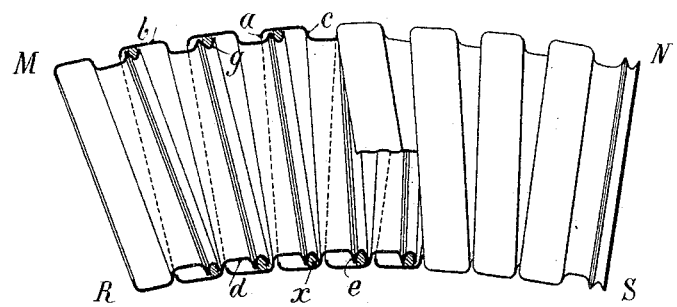
Figure 3:

Figure 1 is a longitudinal section of the pipe in its rectilinear position. Fig. 2 is a view, partly in section, of the same pipe in a curved position. Fig. 3 shows, on an enlarged scale, the profile of this improved pipe.

As may be clearly seen in Fig. 3, the metal band for forming the pipe comprises, as usual, two parts $a\,b\,c$ and $c\,d\,e$, bent in opposite directions and in which the edges or flanges $a$ and $e$ serve to engage the spirals one with another; but following each one of these edges—$e$, for instance—the metal is bent up again, so as to form a groove or channel $f\,g$, intended to receive the elastic thread or packing $x$, which after the winding on of the metal band is held in this helicoidal groove in such a way as to form a tight joint on the almost flat part $b$ of the next spiral. The result of this arrangement is that when the spirals of the pipe separate, as shown in the upper part M N of Fig. 2, the flange $a$ of one spiral encounters the flange $e$ of the next spiral, and when the spirals approach, as shown in the lower part R S of Fig. 2, it is the face $e$ of the spirals which, according to the respective widths given to the parts $b$ and $d$, is encountered either by the projection or flange of the groove, hereinbefore mentioned, or by the flange $a$ of the adjacent spiral. It is thus evident that in all these cases the pressure produced between the spirals in consequence of the curvature of the pipe or the internal pressure to which it is subjected is exerted exclusively between the projecting edges of the spirals—that is to say, metal against metal—and has no action on the packing $x$, which remains always held between the preferably slightly-tapering faces $f$ and $g$ of the groove or channel, and has consequently no tendency to be forced out of its position and can slide over the very slightly-curved face $b$ of the opposed edge of the next spire. It will be seen also in Fig. 3 that the fluid under pressure contained in the pipe and which acts directly on the packing $x$ inserted in the helicoidal groove $f\,g$ can only have the effect of pressing it strongly against the face $b$ of the next spiral and of consequently increasing the tightness of the joint.

In the form of construction shown in Figs. 1 and 2 the shaped metallic band serving to form the pipes is wound in a spiral in such a way that the parts $b\,b$ of the spirals correspond on the exterior of the pipe and the parts $d\,d$ on the interior. The relative forms and dimensions of the various parts of the profile of the spirals and of the groove which forms an integral part of them may of course be varied within certain limits without departing from the principle of the invention.

Finally, and as a consequence of this invention, as the packing $x$ is fixed in a special groove which holds it in place, the india-rubber strip or thread hitherto employed may be replaced by a strip or thread of asbestos treated with india-rubber, tar, bitumen, or other material suited to the nature of the fluid contained in the pipe, which may then be employed not only for water or steam, but also for superheated fluids—such as oils, petroleum, or any other liquids or gases having an action on india-rubber.

We declare that what we claim is—

1. A flexible metallic pipe, comprising in its construction a metallic strip having an inwardly-facing groove and an outwardly-facing groove, the said inwardly and outwardly facing grooves being of considerable width, the metal of the strip being bent so as to form another groove upon the edge of the outwardly-facing groove, and adapted to receive a packing, said edge groove thus formed having its bottom flush with the bottom of the said outwardly-facing wide groove, the construction being such that when the metal strip is wound upon itself to form the flexible pipe the narrow groove will be arranged interiorly of the said pipe and will permit of the pipe being bent or curved in any direction as well as extended or collapsed, substantially as described.

2. A flexible metallic pipe produced by spirally winding a metallic strip having inner and outer facing grooves, the metal of the said strip being shaped so as to form an edge groove upon the outwardly-facing groove, the said edge groove having its bottom upon the same plane with the bottom of the outwardly-facing groove, said groove containing a tight packing capable of sliding over the slightly-curved face of the adjacent spiral, the pressure of the spirals one against the other, resulting from their respective displacements, taking place between the metallic parts of each spiral, substantially as described.

In testimony whereof we have signed our names to this specification in the presence of two subscribing witnesses.

CHARLES RUDOLPH.
GEORGES LEVAVASSEUR.

Witnesses:
JACQUES CONDOMY,
AUGUSTE FOURNOL.